(12) United States Patent  (10) Patent No.: US 8,874,853 B2
 Cantin et al.  (45) Date of Patent: Oct. 28, 2014

(54) LOCAL AND GLOBAL MEMORY REQUEST PREDICTOR

(75) Inventors: Jason F. Cantin, Austin, TX (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 12/793,795

(22) Filed: Jun. 4, 2010

(65) Prior Publication Data

US 2011/0302374 A1    Dec. 8, 2011

(51) Int. Cl.
 *G06F 12/00* (2006.01)
 *G06F 12/08* (2006.01)
(52) U.S. Cl.
 CPC ................... *G06F 12/0813* (2013.01)
 USPC .......................................... 711/137; 711/170
(58) Field of Classification Search
 None
 See application file for complete search history.

(56) References Cited

U.S. PATENT DOCUMENTS

| 7,444,494 | B2 | 10/2008 | Goodman et al. |
| 7,484,042 | B2 | 1/2009 | Goodman et al. |
| 7,512,742 | B2 | 3/2009 | Clark et al. |
| 2006/0179247 | A1 | 8/2006 | Fields, Jr. et al. |
| 2007/0168639 | A1 | 7/2007 | McCalpin et al. |
| 2008/0016284 | A1 | 1/2008 | Goodman et al. |

*Primary Examiner* — Matthew Bradley
(74) *Attorney, Agent, or Firm* — Wood, Herron & Evans, LLP (57) ABSTRACT

A method, circuit arrangement, and design structure utilize broadcast prediction data to determine whether to globally broadcast a memory request in a computing system of the type that includes a plurality of nodes, each node including a plurality of processing units. The method includes updating broadcast prediction data for a cache line associated with a first memory request within a hardware-based broadcast prediction data structure in turn associated with a first processing unit in response to the first memory request, the broadcast prediction data for the cache line including data associated with a history of ownership of the cache line. The method further comprises accessing the broadcast prediction data structure and determining whether to perform an early broadcast of a second memory request to a second node based on broadcast prediction data within the broadcast prediction data structure in response to that second memory request associated with the cache line.

23 Claims, 8 Drawing Sheets

LOCAL AND GLOBAL MEMORY REQUEST PREDICTOR

FIELD OF THE INVENTION

The invention is generally related to computing systems, and more particularly to tracking information about cache lines in a shared memory computing system.

BACKGROUND OF THE INVENTION

Computer technology continues to advance at a remarkable pace, with numerous improvements being made to the performance of both processing units—the "brains" of a computing system—and the memory that stores the data processed by a computing system.

In general, a processing unit is a microprocessor or other integrated circuit that operates by executing a sequence of instructions that form a computer program. The instructions are typically stored in a memory system having a plurality of storage locations identified by unique memory addresses. The memory addresses collectively define a "memory address space," representing an addressable range of memory regions that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory often becomes a significant bottleneck on performance of the microprocessor as well as the computing system. To decrease this bottleneck, it is often desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on performance. Often, a computing system relies on a relatively large, slow and inexpensive mass storage system such as a hard disk drive or other external storage device, an intermediate main memory that uses dynamic random access memory (DRAM) devices or other volatile memory storage devices, and one or more high speed, limited capacity cache memories, or caches, implemented with static random access memory (SRAM) devices or the like. Information from segments of the memory regions, often known as "cache lines" of the memory regions, are often transferred between the various memory levels in an attempt to maximize the frequency that requested cache lines are stored in the fastest cache memory accessible by the microprocessor. Whenever a memory request from a requester attempts to access a cache line, or entire memory region, that is not cached in a cache memory, a "cache miss," or "miss," typically occurs. As a result of a cache miss, the cache line for a memory address typically must be retrieved from a relatively slow, lower level memory, often with a significant performance penalty. Whenever a memory request from a requester attempts to access a cache line, or entire memory region, that is cached in a cache memory, a "cache hit," or "hit," typically occurs and the cache line or memory region is supplied to the requester.

Cache misses in particular have been found to significantly limit system performance. In some designs, for example, it has been found that over 25% of a microprocessor's time is spent waiting for retrieval of cache lines after a cache miss. Therefore, any mechanism that can reduce the frequency and/or latency of cache misses can have a significant impact on overall performance.

One conventional approach for reducing the impact of cache misses is to increase the size of the cache to in effect reduce the frequency of misses. However, increasing the size of a cache can add significant cost. Furthermore, oftentimes the size of the cache is limited by the amount of space available on an integrated circuit device. Particularly when the cache is integrated onto the same integrated circuit device as a microprocessor to improve performance, the amount of space available for the cache is significantly restricted.

Another conventional approach includes decreasing the miss rate by increasing the associativity of a cache, and/or using cache indexing to reduce conflicts. While each approach can reduce the frequency of data cache misses, however, each approach still incurs an often substantial performance hit whenever cache misses occur.

However, conventional approaches for reducing the impact of cache misses often introduce additional problems to shared memory computing systems. Generally, shared memory computing systems include a plurality of microprocessors that share a common memory. Microprocessors are permitted to obtain exclusive or shared ownership of a cache line, with the former usually required whenever a microprocessor needs to modify data stored in the cache line, and the latter being permitted whenever multiple microprocessors merely need to read the data in the cache line. A coherence protocol, typically using either a central directory or a snooping protocol, is used to coordinate the retrieval of a cache line by a microprocessor, such that a requesting microprocessor always receives a current copy of the data in a cache line. A coherence protocol often requires a microprocessor to broadcast a request over a shared memory bus, which results in a lookup being performed either in a central directory or in each individual node in the shared memory system to determine the status of the requested cache line, with the requested cache line ultimately returned to the requesting processor and the status of that cache line being updated to reflect the new ownership status of the cache line. Given that a memory bus is a limited resource, the broadcast of memory requests over the memory bus can result in decreased performance, so it is desirable whenever possible to minimize the number of memory requests that are broadcast over a shared memory bus.

To reduce global bandwidth requirements, many modern shared memory multiprocessor systems are clustered. The processors are divided into groups called SMP nodes, where processors in the same node share a cabinet, board, multi-chip module, or even the same chip, enabling low-latency, high-bandwidth communication between processors in the same node. To reduce global bandwidth requirements, these systems utilize a two-level cache coherence protocol to broadcast requests to processors within a node first (referred to as a "node pump"), and only sending requests to remote nodes if necessary, i.e., when a request cannot be handled in the local node (referred to as a "global pump"). While this "double pump" reduces the global request traffic, global requests are delayed by checking the local node first.

One alternative to a conventional double-pumps is to utilize a special pseudo-invalid coherence state, much like the In and/or Ig states used in the POWER6 system microarchitecture microprocessor developed by International Business Machines ("IBM") of Armonk, N.Y. Those states can be used to predict if cache lines are remote or local. However, these states displace actual data, occupying as much as about 20% of cache memory and increasing cache miss rate an average of about 5%. This, in turn, increases bandwidth and energy requirements for memory subsystems, decreases execution time of workloads, and generally exerts negative time and monetary constraints on the design and use of conventional shared memory computing systems.

Consequently, there is a need in the art for determining when particular memory requests are unnecessary and improving microprocessor communications in a shared memory computing system.

SUMMARY OF THE INVENTION

Embodiments of the invention provide a method, circuit arrangement, and design structure that utilize broadcast prediction data to determine whether to perform an early global broadcast of a memory request in a computing system of the type that includes a plurality of nodes. Specifically, the broadcast prediction data is stored in a broadcast prediction data structure that is, in turn, associated with at least one processing unit of a node. When a processing unit issues a memory request for a cache line, the broadcast prediction data structure is checked to see if it stores data associated with that cache line in order to determine whether to issue a global pump for that cache line concurrently and/or instead of a node pump for that cache line. Thus, if the broadcast prediction data structure indicates that the cache line is not owned or stored within the node, the global pump may be broadcast before a node pump for the cache line is broadcast and/or misses within the node. Thus, the latency normally associated with a node pump missing within a node followed by the issuance of a global memory request may be avoided. However, if the broadcast prediction data structure indicates that the cache line is owned by or stored within the node, the global pump may be prevented, thus reducing additional network traffic due to unnecessary global pumps.

In particular, one embodiment of the invention provides for a method of determining whether to globally broadcast a memory request in a computing system of the type that includes a plurality of nodes, wherein each node includes a plurality of processing units. The method comprises, in a first node among the plurality of nodes, updating broadcast prediction data for a cache line associated with a first memory request within a hardware-based broadcast prediction data structure in turn associated with a first processing unit among the plurality of processing units in response to the first memory request, wherein the broadcast prediction data for the cache line including data associated with a history of ownership of the cache line. The method further comprises accessing the broadcast prediction data structure and determining whether to perform an early broadcast of a second memory request to a second node among the plurality of nodes based on broadcast prediction data within the broadcast prediction data structure in response to that second memory request.

An alternative embodiment provides for a method of responding to cache misses in a clustered shared memory computing system of the type that includes a plurality of nodes, wherein each node includes a plurality of processing units. In that embodiment, the method comprises, in each processing unit in a local node among the plurality of nodes, tracking memory requests issued by other processing units and received by the local node, wherein each memory request is associated with a cache line. The method further comprises, based upon tracking the memory requests, storing broadcast prediction data for a plurality of cache lines in a plurality of hardware-based broadcast prediction data buffers respectively associated with the plurality of processing units in the local node, wherein the broadcast prediction data for each of the plurality of cache lines predicts whether such cache line is cached by a processing unit in the local node or is cached by a processing unit in another, remote node among the plurality of nodes. The method also comprises, in a first processing unit among the plurality of processing units in the local node, responding to a cache miss to a cache line by accessing the associated broadcast prediction data structure and selectively broadcasting a memory request to the other nodes in the clustered shared memory computing system concurrently with broadcasting a memory request to the local node if the broadcast prediction data for the cache line predicts that the cache line is not cached by a processing unit in the local node.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application, use and/or environment. Certain features of the illustrated embodiments may have been enlarged or distorted relative to others to facilitate visualization and clear understanding.

DETAILED DESCRIPTION

Hardware and Software Environment

Figure 1:
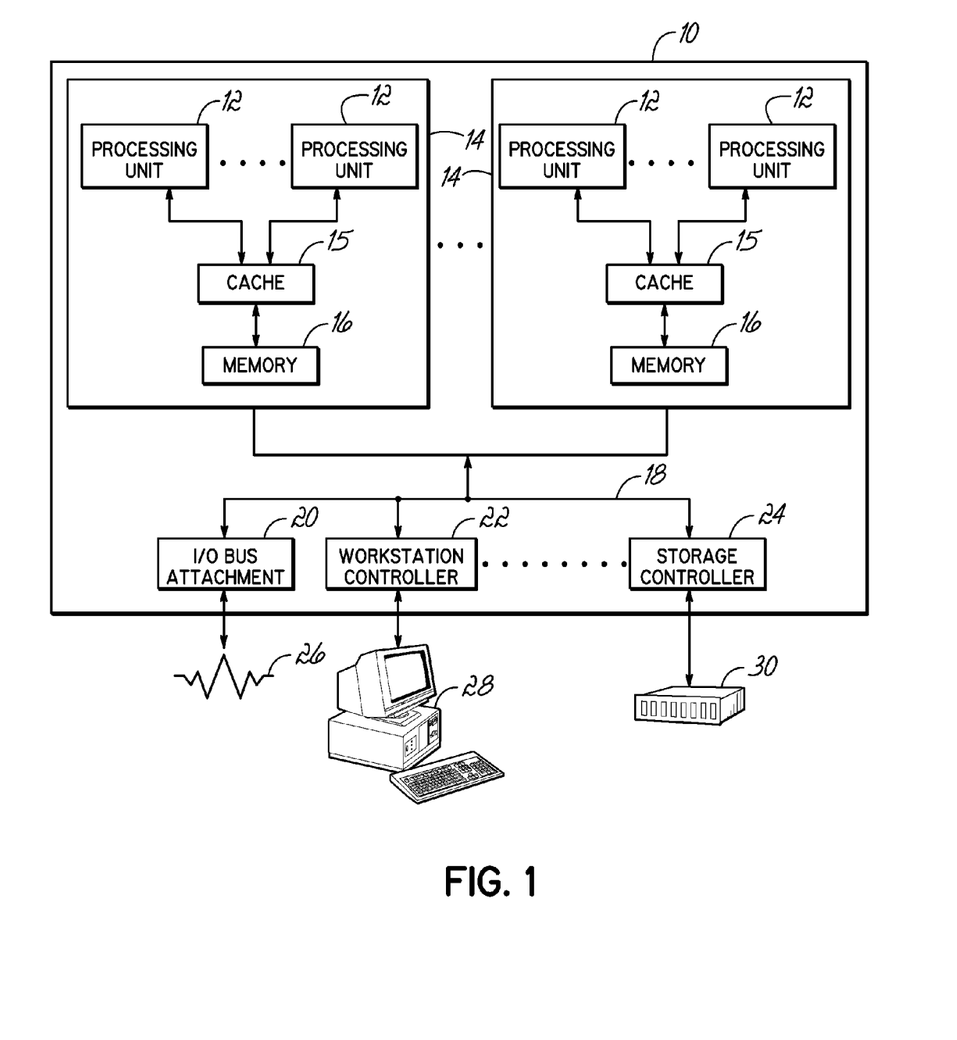
FIG. 1 is a block diagram of a shared memory computing system incorporating cache line broadcast prediction consistent with embodiments of the invention.

Turning more particularly to the drawings, wherein like numbers denote like parts throughout the several views, FIG. 1 is a block diagram of a shared memory computing system 10 consistent with embodiments of the invention. Shared memory computing system 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Shared memory computing system 10 may be referred to as "computing system," but will be referred to as "computer" for the sake of brevity. One suitable implementation of computer 10 may be a multi-user computer, such as a computer available from International Business Machines Corporation.

Computer 10 generally includes one or more processing units 12, such as microprocessors, microcontrollers, and/or other processing elements configured in a computing node 14. Each processing unit 12 is coupled to a memory subsystem that may further include a cache subsystem 15 as well as a main storage 16. The cache subsystem 15 may be comprised of dynamic random access memory ("DRAM"), static random access memory ("SRAM"), flash memory, and/or another digital storage medium that typically comprises one or more levels of data, instruction and/or combination caches, with certain caches serving the processing units 12 in a shared manner as is well known in the art. The main storage 16 may comprise a hard disk drive and/or another digital storage medium. Each processing node 14 may be further configured with an operating system and application (neither shown). Moreover, as will be discussed below, each processing unit 12 may include at least one processing element and at least one level of dedicated cache memory as discussed below.

Each node 14 may be coupled to a number of external devices (e.g., I/O devices) via a system bus 18 and a plurality of interface devices, e.g., an input/output bus attachment interface 20, a workstation controller 22, and/or a storage controller 24, which respectively provide external access to one or more external networks 26, one or more workstations 28, and/or one or more storage devices such as a direct access storage device ("DASD") 30. System bus 18 may also be coupled to a user input (not shown) operable by a user of computer 10 to enter data (e.g., the user input may include a mouse, a keyboard, etc.) and a display (not shown) operable to display data from the computer 10 (e.g., the display may be a CRT monitor, an LCD display panel, etc.). Computer 10 may also be configured as a member of a distributed computing environment and communicate with other members of that distributed computing environment through network 26.

The computer 10 includes at least one memory requester to request a cache line that is serviced by a common cache memory as is well known in the art. In specific embodiments, the requesters in computer 10 may include at least one of the processing units 12, a component of the processing units 12, the cache subsystems 14, and/or a processing element of a processing unit 12 (as well as a hardware thread thereof) below.

Figure 2:
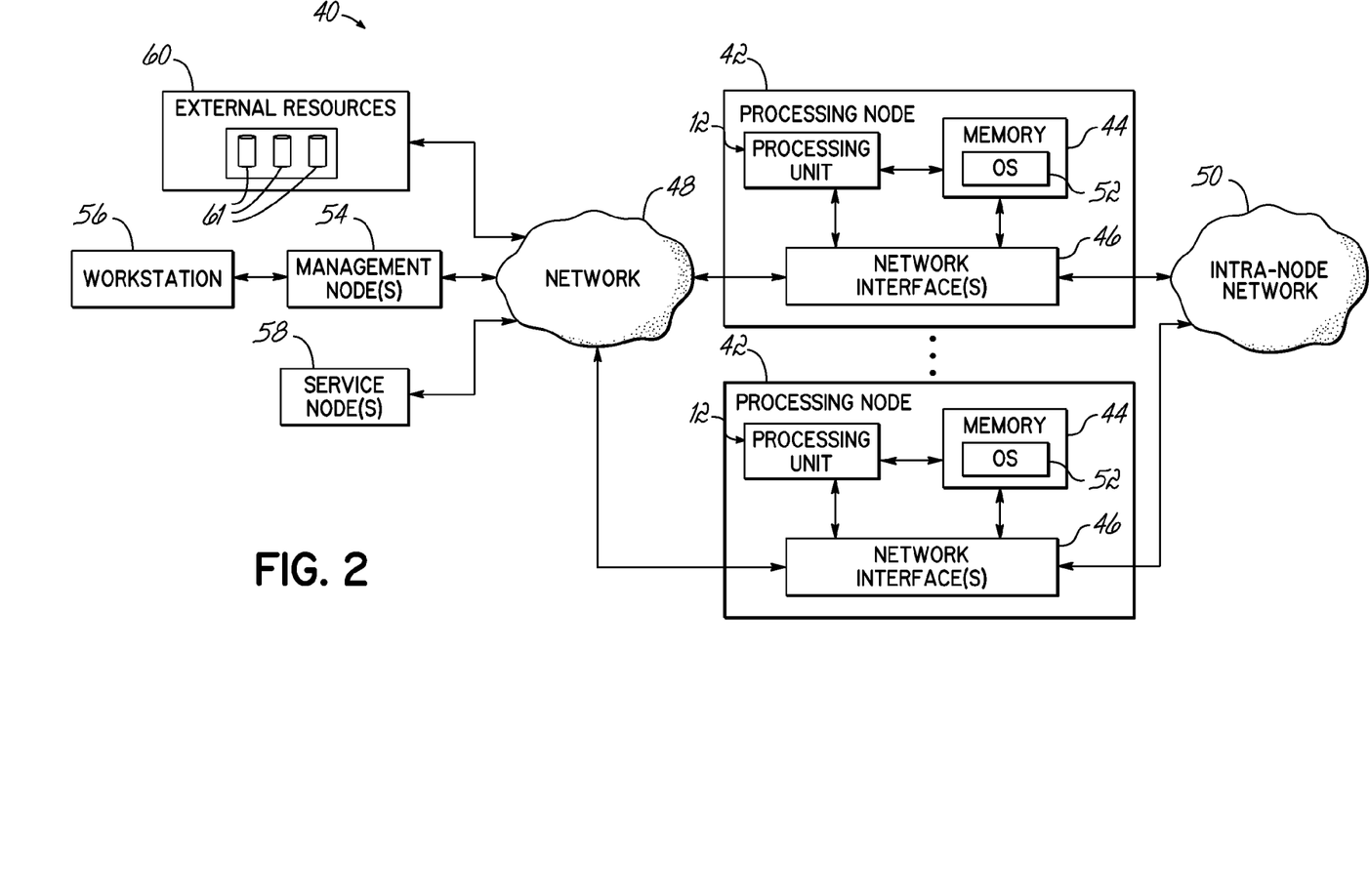
FIG. 2 is a block diagram of a shared memory computing system incorporating cache line broadcast prediction consistent with alternative embodiments of the invention.

Computer 10 is merely representative of one suitable environment for use with embodiments of the invention, and embodiments of the invention may be utilized in various other alternative environments. For example, FIG. 2 is a block diagram of a clustered shared memory computing system 40 consistent with alternative embodiments of the invention. The shared memory computing system 40, hereinafter "system" 40, may include a plurality of processing nodes 42 that each includes at least one processing unit 12, a memory 44, and a network interface 46. The network interface 46, in turn, may communicate with at least one network 48, 50, and in particular the network interface 46 may be configured to communicate with at least one intra-node network 50 dedicated to communication between the processing nodes 42. Each processing node 42 may be configured with an operating system 52 and application (not shown). In typical embodiments, each of the processing nodes 42 is configured to receive and process at least one task with the application, and thus the processing nodes 42, collectively, are configured to perform the bulk of the work of the system 40. In some embodiments, however, some processing nodes 42 may be configured as dedicated I/O nodes and thus maintain an interface between a subset, or "group," of processing nodes 42 and the network(s) 48, 50. Moreover, I/O nodes may be operable to perform process authentication and authorization, task accounting, debugging, troubleshooting, booting, and configuration operations as is well known in the art. Thus, the total work for a group of processing nodes 42 may be simplified and additional burdens on each of the group of processing nodes 42 that would be presented by interfacing with the entirety of the processing nodes 42 and the rest of the system 40 are avoided. A processing node 42 may include more than one processing unit 12, and, in specific embodiments, each node 42 may include two or four processing units 12 as is well known in the art.

The system 40 may include one or more management nodes 54 that may store compilers, linkers, loaders, and other programs to interact with the system 40. The management nodes 54 may be accessed by a user at a workstation 56, which may be controlled by at least one management node 54. Thus, the user may submit one or more programs for compiling, tasks for execution, execution contexts, workloads, part of a workload, or jobs to one or more management nodes 54, which in turn may provide that one or more programs for compiling, tasks for execution, execution contexts, workloads, part of a workload, or jobs to one or more service nodes 58 of the system 40. The management nodes 54 may perform auxiliary functions which, for reasons of efficiency or otherwise, may be best performed outside the processing nodes 42 or service nodes 58. For example, interactive data input, software code editing, software code compiling and/or other user interface functions may be handled by the management nodes 54.

The service nodes 58 may include databases and/or administrative tools for the system 40. The databases may maintain state information for the processing nodes 42, including the current scheduling of tasks across the processing nodes 42, while the administrative tools may control the scheduling and loading of programs, tasks, data, and jobs onto the processing nodes 42, including controlling the scheduling and loading of programs, tasks, data, and jobs onto one or more processing units 12 of one or more processing nodes 42. As such, the service nodes 58 may, in some embodiments, gather a group of processing nodes 42 from the plurality of processing nodes 42 and dispatch at least one task, job, application, part of a workload, execution context, or program to the group of processing nodes 42 for execution. Hereinafter, the at least one task, job, application, part of a workload, execution context, or program will be referred to as a "task" for the sake of brevity. A task may be communicated across the network 48 and/or 50 and through I/O nodes to a processing node 42 for processing. The functionality of the management nodes 54 and/or service nodes 58 may be combined in a control subsystem operable to receive, manage, schedule, redistribute and otherwise control jobs for the processing nodes 42.

Management nodes 54 and/or service nodes 58 may each include a group of processing nodes 42 and at least one I/O node. In this way, management nodes 54 and/or service nodes 58 may be internally connected to the processing nodes 42 through the intra-node network 50 as well as network 48 (connection not shown). Alternatively, management nodes 54 and/or service nodes 58 may each include of a group of processing nodes 42 and at least one I/O node separate from the system 40 (i.e., the management nodes 54 and/or service nodes 58 may be configured as "stand-alone" nodes). Furthermore, management nodes 54 and/or services nodes 58 may include only one processing node 42 each. One or more external resource servers 60 may be servers accessible over the network 48 and configured to provide interfaces to various data storage devices, such as, for example, hard disk drives 61, optical drives (e.g., CD ROM drives, CD R/RW drives, DVD+/−R/RW drives, Blu-Ray drives, etc.), solid state memory drives, or other I/O devices, resources or components that may be accessed for data and/or to process a task.

In a similar manner as the computer 10, the memory 44 of each processing node 42 may include a cache subsystem comprised of DRAM, SRAM, flash memory and/or another digital storage medium. Additionally, the memory 44 of each processing node 42 may further comprise a main storage that comprises a hard disk drive and/or another digital storage medium. Also similarly, the cache subsystem may comprise one or more levels of data, instruction and/or combination caches, with certain caches serving the processing units 12 in a shared manner as is well known in the art.

A node, whether configured as a processing node 42, I/O node, management node 54, or service node 58, is a portion of the system 40 that includes one or more requesters for cache lines and is serviced by a common cache memory (e.g., the memory 44 or a cache memory internal to at least one processing unit 12 of the node 42) as is well known in the art. In specific embodiments, the requesters in the system 40 may include a processing node 42 (hereinafter, "node" 42), a memory 44 of a node, at least one processing unit 12, a component of a processing unit 12, and/or a processing element of a processing unit 12 (as well as a hardware thread thereof). In specific embodiments each node 42 may be configured to process one or more tasks, as well as cooperate with the other nodes 42 to process one or more tasks by communicating with those nodes through respective network interfaces 46 to process the one or more tasks in a parallel fashion as is well known in the art.

Although one network interface 46 is shown in FIG. 2, each node 42 may include a plurality of network interfaces 46 or other network connections. As such, each node 42 may be configured to communicate through various networks, including the intra-node network 50. For example, each node 42 may communicate to every other node 42 through a torus network. Moreover, various nodes 42 may be custom configured to perform various functions. As such, some nodes 42 of the system 40 may be configured as computing nodes (e.g., to receive at least one task and process that at least one task), I/O nodes (e.g., to manage the communications to and/or from each computing node), management nodes (e.g., to manage the system 40), and/or service nodes (e.g., to monitor the system 40, schedule one or more tasks and/or support the computing or management nodes). As such, and in some embodiments, the system 40 may have an architecture consistent with a BlueGene® parallel computing system architecture as developed by International Business Machines ("IBM") of Armonk, N.Y. In alternative embodiments, the system 40 may have an architecture consistent with a RoadRunner parallel computing system architecture as also developed by IBM. Moreover, and in further alternative embodiments, the system 40 may have an architecture consistent with a non-uniform memory access ("NUMA") and/or a cache coherent NUMA ("ccNUMA") computing system as is well known in the art. It will also be appreciated that nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

As illustrated through FIG. 1 and FIG. 2, the respective node 14 and node 42 may include one or more processing units 12 as is well known in the art. During operation, various instructions and/or data organized into "cache lines" may be required to process a task. As such, and as is well known in the art, it is desirable to predict whether a request will have to be made globally to the computer 10 and/or system 40, or locally to the node 14 and/or node 42, to prevent excess network traffic and speed the operation of the node 14 and/or node 42. However, determining whether a request is to be made globally or locally in a shared memory computing system, such as that illustrated in either FIG. 1 or FIG. 2, presents additional challenges as cache lines may be processed across many processing units 12 as well as over many nodes 14 and/or 42. As such, determining whether a request for a cache line is to be made globally, and in particular a determination whether a request for a cache line is to be made globally concurrently with a local broadcast of that memory request, consistent with embodiments of the invention may be implemented in a circuit arrangement or other integrated circuit device to track broadcast prediction data for a cache line to aid in that determination. However, it should be appreciated that a wide variety of programmable devices may determine whether a request for a cache line is to be made globally or locally consistent with embodiments of the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language ("HDL") such as VHDL, verilog, EDIF, etc. While the invention has and hereinafter will be described in the context of circuit arrangements implemented in fully functioning integrated circuit devices and shared memory computing systems utilizing such devices and/or circuit arrangements, those skilled in the art will appreciate that circuit arrangements consistent with the invention are capable of being distributed as program products in a variety of forms, and that the invention applies equally regardless of the particular type of computer readable media used to actually carry out the distribution. Examples of computer readable media include but are not limited to non-transient, recordable type media such as volatile and non-volatile memory devices, floppy disks, hard disk drives, flash memory drives, CD-ROM's, and DVD's, among others.

Figure 3:
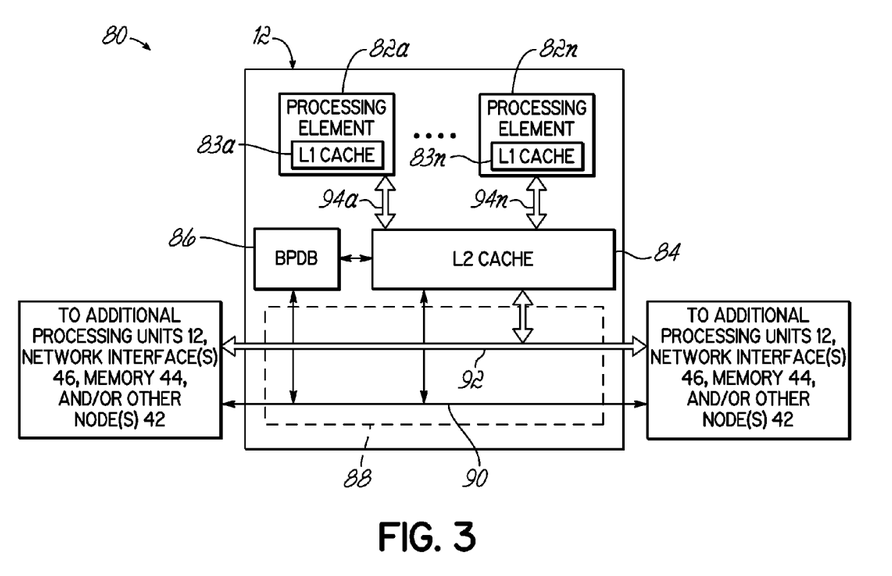
FIG. 3 is a schematic illustration of several components of a circuit arrangement of a processing node of the system of FIG. 2.
Figure 4:
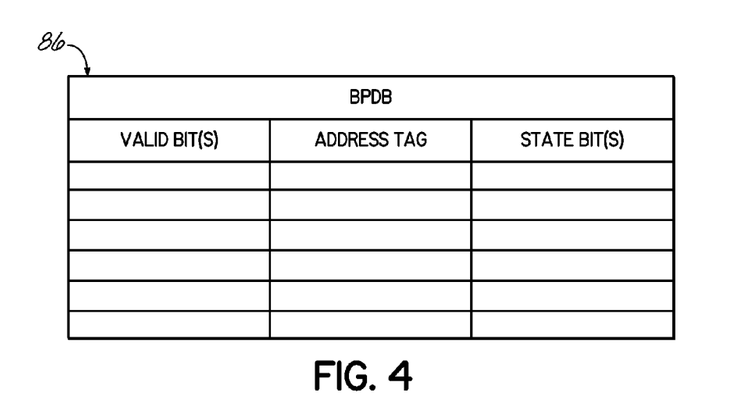
FIG. 4 is a diagrammatic illustration of one embodiment of broadcast prediction data that may be stored by a broadcast prediction data buffer disposed in the circuit arrangement of FIG. 3.
Figure 5:
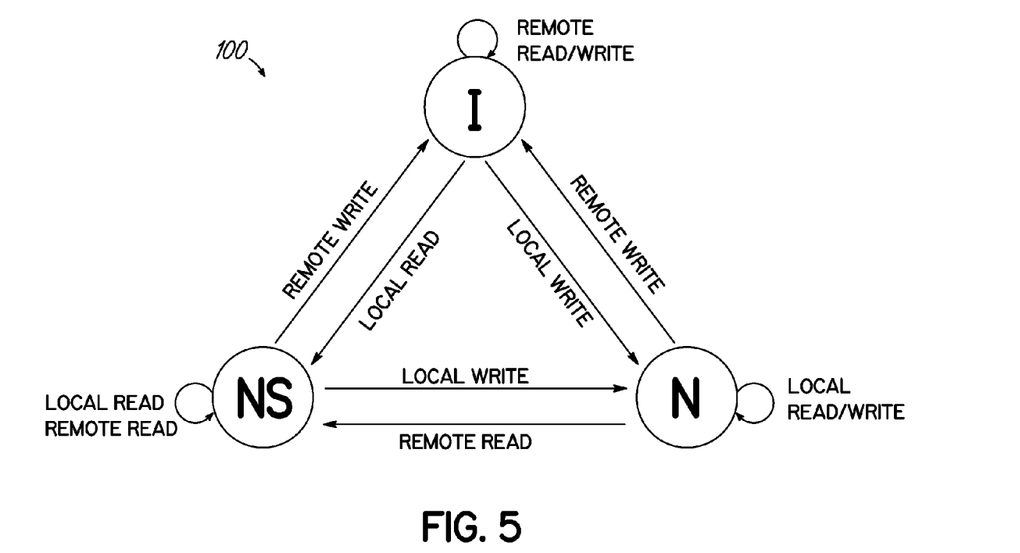
FIG. 5 illustrates a state transition diagram for a cache line that includes three states and illustrates one embodiment of a migration of states as that cache line is subject to memory requests by the system of FIG. 2.
Figure 6:
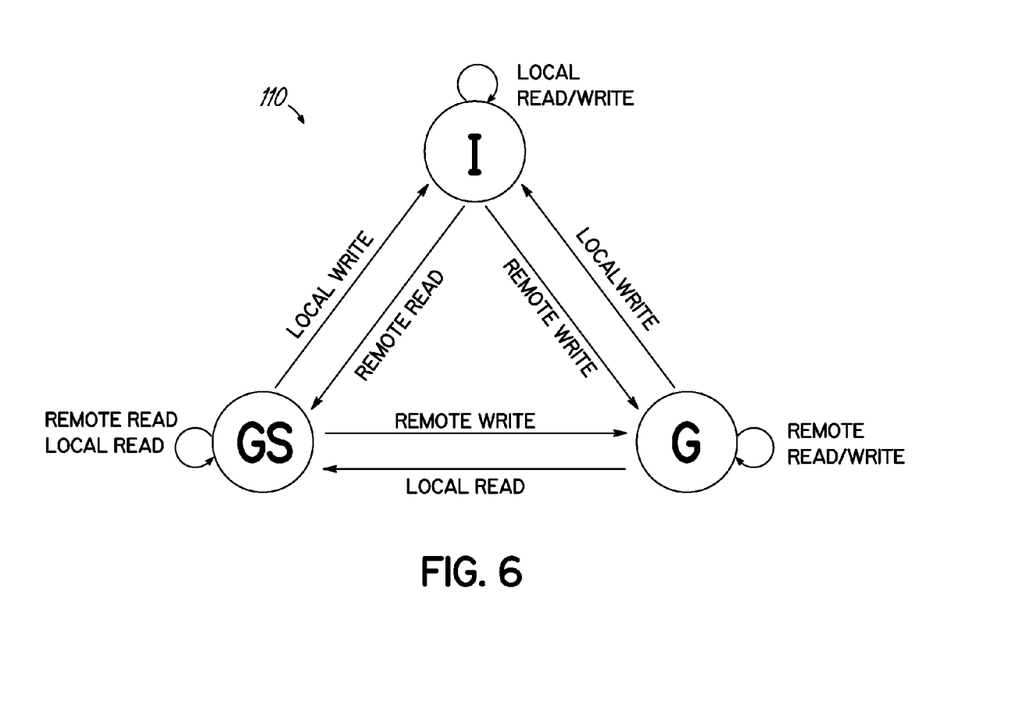
FIG. 6 illustrates a state transition diagram for a cache line that includes three states and illustrates an alternative embodiment of a migration of states as that cache line is subject to memory requests by the system of FIG. 2.
Figure 7:
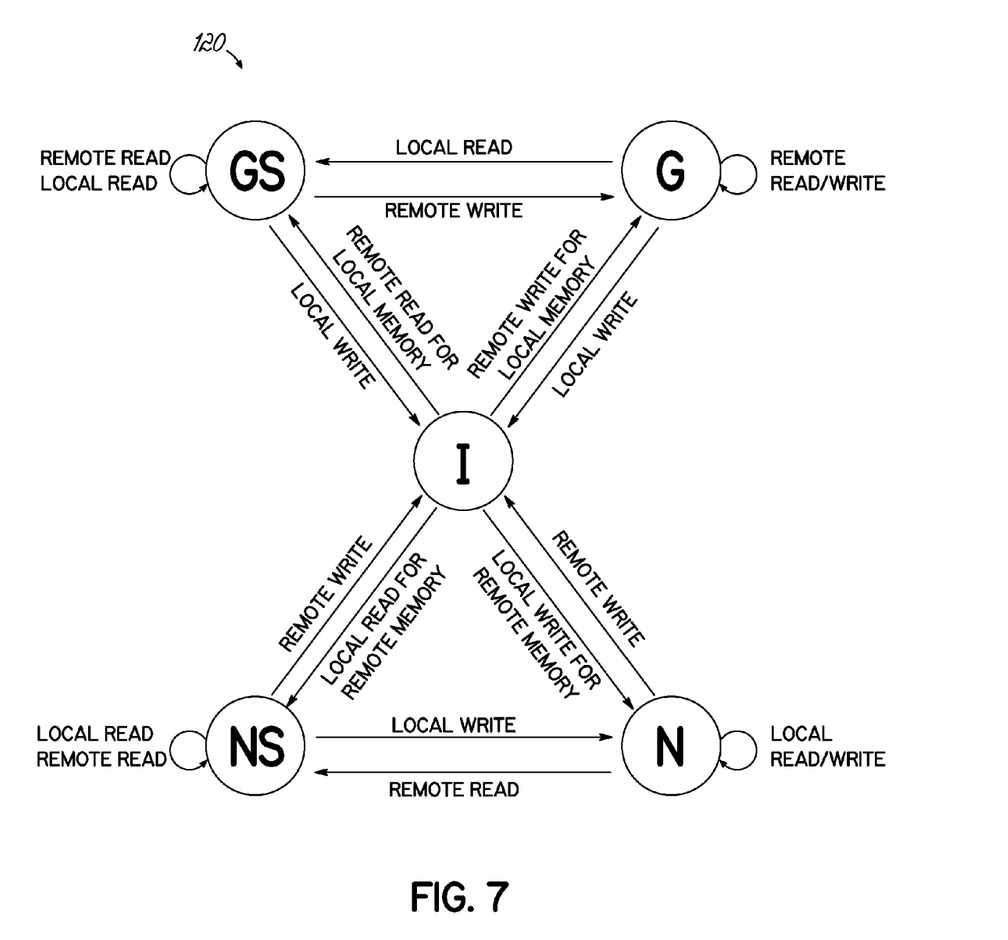
FIG. 7 illustrates a state transition diagram for a cache line that includes five states and illustrates one embodiment of a migration of states as that cache line is subject to memory requests by the system of FIG. 2.

FIG. 3 is a schematic illustration of various components of a circuit arrangement for a processing unit 12 of a node 14 and/or node 42 consistent with embodiments of the invention, FIG. 4 is a schematic illustration of a broadcast prediction data buffer consistent with embodiments of the invention, FIGS. 5-7 are state transition diagrams, while FIGS. 8-11 are illustrations of flowcharts for logic flows in a 14 and/or node 42 consistent with embodiments of the invention. Although the following FIGS. 3-11 are all made with reference to the shared memory computing system 40 of FIG. 2, the circuit arrangement 80 illustrated in FIG. 3, the broadcast prediction data buffer of FIG. 4, the state transition diagrams of FIGS. 5-7, and the flowcharts of FIGS. 8-11 are equally applicable to the computer 10 of FIG. 1 without departing from the scope of the invention.

FIG. 3 is a schematic illustration showing several components of one embodiment of a circuit arrangement 80 in a processing unit 12 of a node 42 consistent with embodiments of the invention. The processing unit 12 may include at least one processing element 82 (e.g., as illustrated, processing elements 82a-n) that in turn each includes a level-one ("L1") cache 83 (e.g., as illustrated, L1 caches 83a-n. Each processing element 82 is in communication with at least one additional cache, which may be a level-two ("L2") cache 84 as is well known in the art. In some embodiments, the processing element 82 is configured to process several different threads of execution at once, and thus may be a multi-threaded processing element as is known in the art. In some embodiments, the L1 cache 83 and/or L2 cache 84 (the "caches 83, 84") are configured to receive a plurality of cache lines (e.g., instructions and/or data) from at least one memory region (e.g., at least a portion of the memory in a memory 44 on that or other nodes 42, and/or at least a portion of the memory across the network 48 in the management nodes 54, workstation 56, service nodes 58, and/or external resource server 60) for the processing element 82 to execute a task. A memory region may be an aligned region of memory that ranges in size from about two cache lines to a predetermined physical page size for the system 40. Specifically, each memory region may be a power-of-two multiple of the number of cache lines in that memory region multiplied by the size of each cache line. For example, if a memory region has four lines (e.g., $2^2$ cache lines) with about 128 bytes per cache line, the memory region may be about 512 bytes long. Thus, the caches 83, 84 may be configured to store a plurality of cache lines from at least one memory region.

As illustrated in FIG. 3, the processing unit 12 may include a broadcast prediction data buffer 86 (illustrated as, and hereinafter, "BPDB" 86) to track broadcast prediction data associated with one or more cached cache lines (e.g., cache lines stored in the caches 83, 84). In some embodiments, the broadcast prediction data may include information associated with the history of ownership of a cache line, as well as validity data and/or an address for that cache line. As such, each entry in the BPDB 86 may be used to predict whether local or remote cached copies exist for a particular cache line.

In some embodiments, each processing element 82 is configured to communicate with the L2 cache 84 through a command bus 94 (e.g., as illustrated, processing element 82a-n communicates with L2 cache 84 through respective command buses 94a-n). In turn, the L2 cache 84 and/or the BPDB 86 is configured to interface with a network fabric interface 88 which may provide communications between the L2 cache 84 and/or the BPDB 86 and a node request/response bus 90, as well as provide communications between the L2 cache 84 and a data bus 92. In some embodiments, the node request/response bus 90 and data bus 92 are configured to communicate between the processing units 12 and/or nodes 42 of the system 40 such that a memory request from a memory requester in a first node 42 may be broadcast to the other nodes of the system 40, including to a second node 42 of the system 40. In specific embodiments, a memory requester in the circuit arrangement 80 may include the caches 83, 84, and/or the processing elements 82 or hardware thread thereof. In some embodiments, each processing unit 12 may be a POWER system microarchitecture microprocessor as distributed by IBM. Although not intended to be limiting, each processing unit 12 may alternatively be a POWER4, POWER5, POWER6, and/or POWER7 system microarchitecture microprocessor.

Consistent with embodiments of the invention, a memory request from a memory requester in the processing unit 12 is analyzed with respect to the data in the BPDB 86 before it is broadcast to additional processing units 12 and/or nodes 42 of the system 40, if at all. In specific embodiments, the memory request from a memory requester is analyzed with respect to the data in the BPDB 86 concurrently with a node pump of that memory request addressed to the local processing units 12 and/or processing elements 82 of a particular node 42 (e.g., a local memory request). Specifically, FIG. 4 is a diagrammatic illustration of one embodiment of broadcast prediction data that may be stored in the BPDB 86 consistent with embodiments of the invention. In some embodiments, the broadcast prediction data includes information about at least one cached cache line that is cached locally in the processing unit 12 or node 42. In alternative embodiments, the broadcast prediction data includes information about at least one cached cache line that is cached remotely in at least one remote processing unit 12 or node 42. In further alternative embodiments, the broadcast prediction data includes information about at least one cached cache line that is cached either locally in the processing unit 12 or node 42 or remotely in at least one remote processing unit 12 or node 42. In specific embodiments, the BPDB 86 may be configured as a tagged set-associative array for increased accuracy, or a tagless address-hash-indexed array for increased space-efficiency. As illustrated in FIG. 4, the BPDB 86 is configured as a tagged, set-associative array that may include, for each entry, at least one valid bit to indicate the validity of at least one cached cache line, an address tag to indicate the memory region and other locational information of the at least one cached cache line, and/or at least one state bit to indicate the state of the at least one cached cache line (e.g., states may include one or more of the following: Invalid, Node Shared, Node Modified, Globally Shared, and Globally Modified).

In some embodiments, the BPDB 86 may be updated in response to memory requests from a local memory requester of the node 42 upon which it is configured. In alternative embodiments, the BPDB 86 is updated in response to memory requests from a remote memory requester of the system 40. In further alternative embodiments the BPDB 86 is updated in response to memory requests from both local and remote memory requesters.

As indicated above, the BPDB 86 may be configured to track the status of a cache line by monitoring primarily local memory requests, and in specific embodiments an entry may indicate that a cache line is in the Invalid (I), Node Shared (NS), or Node Modified (N) state. As such, the BPDB 86 stores the addresses of recently observed requests from local processing units 12 that miss in the cache, and optionally replacements and invalidations from the cache (which, for the purposes of the invention, are also considered to be memory requests). Recent requests from local processing units 12 on the same node 42 may serve to indicate whether data is cached locally. FIG. 5 illustrates a state diagram 100 for a cache line consistent with embodiments of the invention that includes three states (the I, NS, and N states), and that further illustrates possible migrations of those states as that cache line is subject to memory requests. In some embodiments, the NS state indicates that a readable copy of the data may exist in the processing unit 12 and/or node 42. Thus, the BPDB 86 indicates that an early global memory request for that cache line from remote processing units 12 and/or nodes 42 may be unnecessary. In this regard, an early global memory request may be considered to be any global memory request that is broadcast to other processing units or nodes concurrently with a local memory request that is broadcast within a local processing unit or node, or that is otherwise broadcast in lieu of a local memory request or at some point prior to completion of the local memory request. As such, a memory request for a cache line in the NS state may be sent to a local processing unit 12 and/or node 42 first, and only to remote processing units 12 and/or nodes 42 in the event that the cache line is not located locally. The N state, however, indicates that a readable copy of the data more than likely exists in the processing unit 12 and/or node 42. Thus, the BPDB 86 indicates that an early global memory request for that cache line is probably unnecessary. The I state, on the other hand, indicates that no cached copies are believed to exist in the processing unit 12 and/or node 42, and thus the BPDB 86 indicates that an early global memory request for the cache line from remote processing units 12 and/or nodes 42 is advisable. As such, a global memory request for the cache line may be immediately broadcast to remote processing units 12 and/or nodes 42 (and in particular concurrently with a local memory request for the cache line broadcast to local processing units 12 in the node 42).

In some embodiments, and in response to a memory request associated with a cache line, When there is an entry in the BPDB 86 associated with that cache line and the cache line is in the I state, the BPDB 86 determines whether that memory request is from a local or remote memory requester. When there is an entry associated with the cache line in the I state and the memory request is from a remote memory requester, the BPDB 86 ignores that memory request. However, when there is an entry associated with the cache line in the I state and the memory request is from a local memory requester, the BPDB 86 migrates the cache line to the NS state if the memory request is a read operation and migrates the cache line to the N state if the memory request is a write operation. When there is an entry associated with the cache line in the NS state, the BPDB 86 migrates the cache line to the I state if the memory request is a remote write, migrates the cache line to the N state if the memory request is a local write, and ignores the memory request if it is a local read or a remote read. When there is an entry associated with the cache line in the N state, the BPDB 86 migrates the cache line to the I state if the memory request is a remote write, migrates the cache line to the N state if the memory request is a remote read, and ignores the memory request if it is a local read or a local write. Thus, in that embodiment, the BPDB 86 can reduce bandwidth of communications used to broadcast global memory requests.

Alternatively, the BPDB 86 may be configured to track the status of a cache line by monitoring primarily remote memory requests, and in specific embodiments an entry may indicate that a cache line is in the Invalid (I), Globally Shared (GS), or Globally Modified (G) state. As such, the BPDB 86 stores the addresses of recently observed requests from remote processing units 12 or nodes 42 that miss in their caches, and optionally replacements and invalidations from their caches. Recent requests from remote processing units 12 and/or nodes 42 may serve to indicate whether the data is cached locally. FIG. 6 illustrates a state diagram 110 for a cache line consistent with embodiments of the invention that includes three states (the I, GS, and G states), and that further illustrates possible migrations of those states as that cache line is subject to memory requests. In some embodiments, the GS state indicates that a readable copy of the data may exist in the processing unit 12 and/or node 42. Thus, the BPDB 86 indicates that an early global memory request for that cache line from remote processing units 12 and/or nodes 42 may be unnecessary. As such, a memory request for a cache line in the GS state may be sent to a local processing unit 12 and/or node 42 first, and only to remote processing units 12 and/or nodes 42 in the event that the cache line is not located. Specifically, a memory request for a cache line in the GS state may broadcast to remote processing units 12 and/or nodes 42 in the event that the memory request is for a modifiable copy. The G state, however, indicates that a readable copy of the data more than likely exists in remote processing units 12 and/or nodes 42. Thus, the BPDB 86 indicates that a global memory request for that cache line from remote processing units 12 and/or nodes 42 is probably necessary. As such, a global memory request for the cache line may be immediately broadcast to remote processing units 12 and/or nodes 42 (and in particular concurrently with a local memory request for the cache line broadcast to local processing units 12 in the node 42). The I state, on the other hand, indicates that cached copies is believed to exist in the processing unit 12 and/or node 42, and thus the BPDB 86 indicates that an early global memory request for the cache line from remote processing units 12 and/or nodes 42 is not advisable.

In some embodiments, and in response to a memory request associated with a cache line, when there is an entry in the BPDB 86 associated with that cache line and the cache line is in the I state, the BPDB 86 determines whether that memory request is from a local or remote memory requester. When there is an entry associated with the cache line in the I state and the memory request is from a local memory requester, the BPDB 86 ignores that memory request. However, when there is an entry associated with the cache line in the I state and the memory request is from a remote memory requester, the BPDB 86 migrates the cache line to the GS state if the memory request is a read operation and migrates the cache line to the G state if the memory request is a write operation. When there is an entry associated with the cache line in the GS state, the BPDB 86 migrates the cache line to the I state if the memory request is a local write, migrates the cache line to the G state if the memory request is a remote write, and ignores the memory request if it is a remote read or a local read. When there is an entry associated with the cache line in the G state, the BPDB 86 migrates the cache line to the I state if the memory request is a local write, migrates the cache line to the N state if the memory request is a local read, and ignores the memory request if it is a remote read or a remote write. Thus, in that embodiment, the BPDB 86 can reduce the latency of global memory requests.

Further alternatively, the BPDB 86 may be configured to track the status of a cache line by monitoring both local and remote memory requests and thus indicate whether a cache line is mapped to a local processing unit 12 and/or node 42 but used by remote processing units 12 and/or nodes 42. As such, the BPDB 86 is configured to indicate whether a cache line is in the I, NS, GS, N, or G state. FIG. 7 illustrates a state diagram 120 for a cache line consistent with embodiments of the invention that includes five states (the I, NS, GS, N, and G states), and that further illustrates possible migrations of those states as that cache line is subject to memory requests. Specifically, the state diagram 120 for a cache line is a combination of the state diagram 100 of FIG. 5 as well as the state diagram 110 of FIG. 6. Thus, in specific embodiments, the state diagram 120 is a combined predictor with an address decoder that avoids storing entries for local addresses in which all the cached copied are local, as well as avoids storing remote addresses that do not have any locally cached copies. Thus, if an address for a cache line is not located in the BPDB 86, the address is decoded and used to predict if the data is local or remote. The BPDB 86, when configured to implement states for cache lines as illustrated in state diagram 120, only stores information for exception cases in which a cache line is mapped to a local processing unit 12 and/or node 42 but used by remote processing units 12 and/or nodes 42. Thus, the BPDB 86 transitions a cache line from the I state to the GS state when a memory request is a remote read for a cache line stored in the processing unit 12 and/or node 42, transitions from the I state to the G state when a memory request is a remote write for a cache line stored in the processing unit 12 and/or node 42, transitions from the I state to the NS state when a memory request is a local read for a cache line stored in a remote processing unit 12 and/or node 42, and transitions from the I state to the N state when a memory request is a local write for a cache line stored in a remote processing unit 12 and/or node 42.

Although illustrated as including the I, NS, GS, N, and/or G states, in some embodiments the BDPB 86 may be used in conjunction with existing In and/or Ig states that are well known and used in the POWER6 system microarchitecture microprocessor. As such, cache lines in the In and/or Ig states may be cast out to the BPDB 86 instead of to lower levels of a cache hierarchy. Thus, these states are prevented from displacing valid data in lower levels of a cache hierarchy and allow the BDPB 86 and other states to work in conjunction to make more space for valuable cache line information.

Moreover, and in some embodiments, the BDPB 86 may include a directory, or partial directory, of cache lines in the node 42. Thus, should a prediction indicate that there are not cached copies of a cache line owned by a remote node 42, the directory or partial directory may be used to track whether a cache line in the memory of the local node 42 has merely been read by remote nodes 42, thus indicating that the memory of the local node 42 may include that cache line. In those embodiments, the system may experience fewer global broadcasts for cache lines. Still further, and in some embodiments, the state of a cache line in the BPDB 86 may be updated by a write-back request. In general, write-back requests indicate the replacement of modified cache lines and may indicate that a owned and/or exclusive copy of a cache line may no longer exist in a node 42.

In alternative embodiments, the BDPB 86 may not include either the N or GS state. Specifically, the N state may be merged with the NS state for a small performance loss. In that instance, there is still a benefit from predicting that cached copies of cache lines exists in the local node 42 such that reads and writes may be satisfied locally, particularly when most of the request traffic is for read operations. Similarly, the GS state may be merged with the aforementioned Ig state. In that instance, there is still a benefit from predicting that cached copies may exist in remote nodes 42 such that local write operation must be broadcast.

Figure 8:
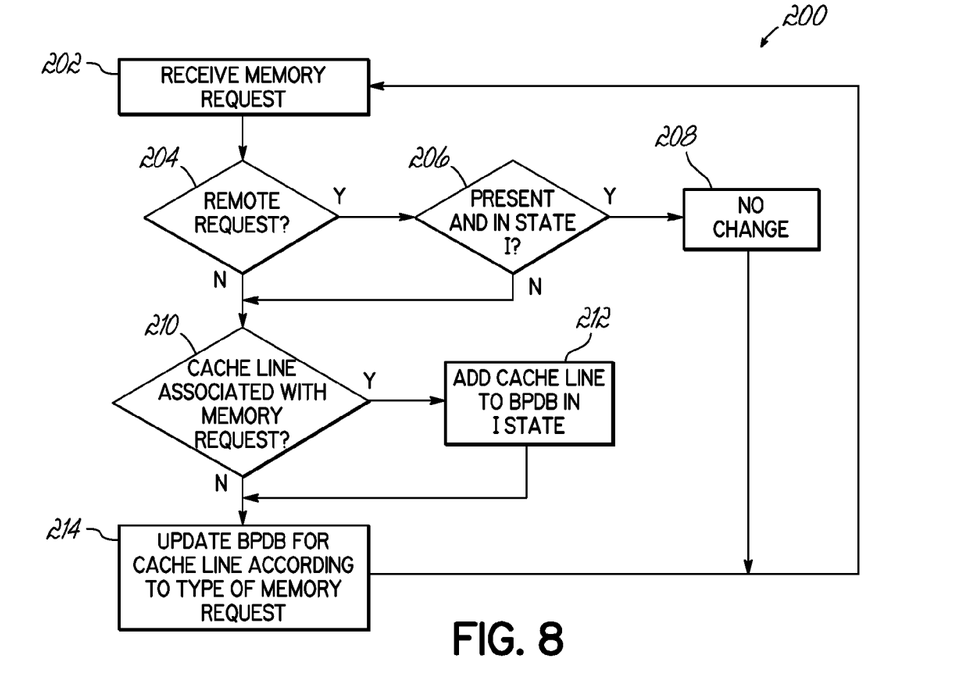
FIG. 8 is a flowchart illustrating one embodiment of a logic flow that may occur in a broadcast prediction data buffer disposed in the system of FIG. 2 to update broadcast prediction data with information predictive of whether to broadcast a global memory request for a cache line.

FIG. 8 is a flowchart 200 illustrating one embodiment of a sequence of operations that may occur in a node in a shared memory computing system ("system") to update a BPDB with information predictive of the state and/or ownership of a cache line. Specifically, the flowchart 200 may be utilized to adjust a BPDB in response to, primarily, local memory requests. Initially, a memory request associated with the cache line is received (block 202). In some embodiments, the memory request may be from a processing unit on the node or from another node of the system. The sequence of operations thus determines if the memory request is from a remote memory requester or is from a local memory requester (i.e., whether the memory request is a remote request or a local request, respectively) (block 204). When the memory request is a remote request ("Yes" branch of decision block 204) it is determined whether there is an entry for cache line that associated with the memory request in the BPDB and whether that cache line is in the I state (block 206). When there is no entry for the cache line associated with the memory request or when the cache line is in the I state ("Yes" branch of decision block 206) there is no change to the state associated with the entry for the cache line, nor is there an addition to the BPDB for that cache line (block 208).

However, when the memory request is not a remote request ("No" branch of decision block 204) or when the memory request is a remote request but there is an entry for the cache line associated with the memory request and the state of that cache line is the I state ("No" branch of decision block 206) it is determined whether there is an entry corresponding to the cache line associated with the memory request in the BPDB (block 210). When there is not such an entry in the BPDB ("No" branch of decision block 210) an entry for the cache line associated with the memory request is added to the BPDB and its state is set to I (block 212). After determining that there is an entry for the cache line associated with the memory request in memory ("Yes" branch of decision block 210) or after adding an entry for a cache line in the BPDB (block 212), the sequence of operations updates the entry in the BPDB for the cache line according to operation associated with the memory request (e.g., according to what type of memory request the memory request is) (block 214). Specifically, the sequence of operations may update an entry in the BPDB consistent with the state diagram 100 illustrated in FIG. 5.

Figure 9:
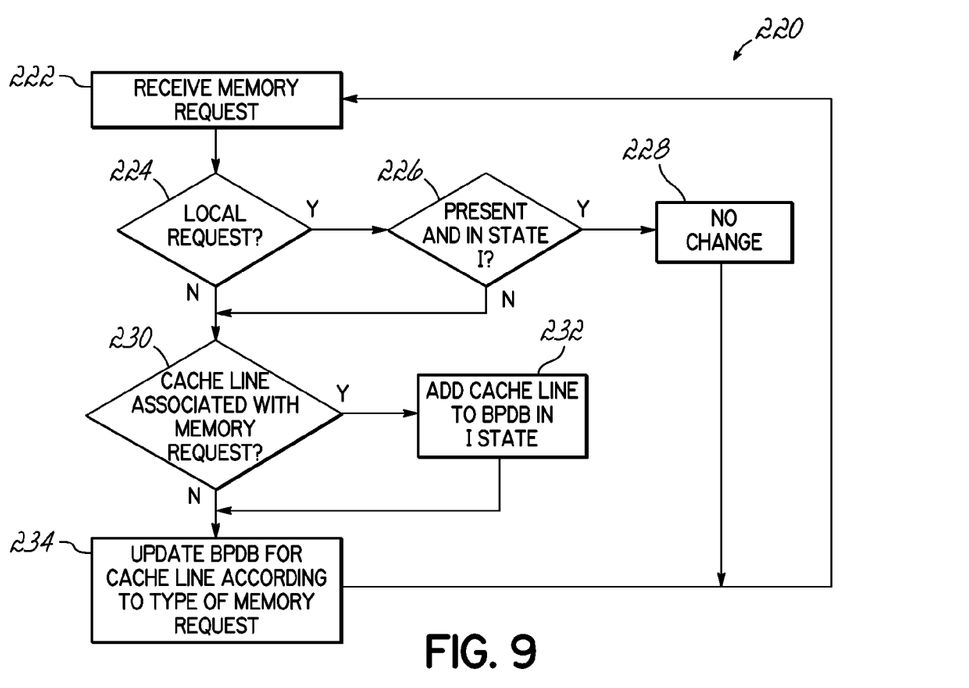
FIG. 9 is a flowchart illustrating an alternative embodiment of a logic flow that may occur in a broadcast prediction data buffer disposed in the system of FIG. 2 to update broadcast prediction data with information predictive of whether to broadcast a global memory request for a cache line.

FIG. 9 is a flowchart 220 illustrating one embodiment of a sequence of operations that may occur in a node in a system to update a BPDB with information predictive of the state and/or ownership of a cache line. Specifically, the flowchart 220 may be utilized to adjust a BPDB in response to, primarily, remote memory requests. Initially, a memory request associated with the cache line is received (block 222). In some embodiments, the memory request may be from a processing unit on the node or from another node of the system. The sequence of operations thus determines if the memory request is from a remote memory requester or is from a local memory requester (i.e., whether the memory request is a remote request or a local request, respectively) (block 224). When the memory request is a local request ("Yes" branch of decision block 224) it is determined whether there is an entry for cache line that associated with the memory request in the BPDB and whether that cache line is in the I state (block 226). When there is no entry for the cache line associated with the memory request or when the cache line is in the I state ("Yes" branch of decision block 226) there is no change to the state associated with the entry for the cache line, nor is there an addition to the BPDB for that cache line (block 228).

However, when the memory request is not a local request ("No" branch of decision block 224) or when the memory request is a local request but there is an entry for the cache line associated with the memory request and the state of that cache line is the I state ("No" branch of decision block 226) it is determined whether there is an entry corresponding to the cache line associated with the memory request in the BPDB (block 230). When there is not such an entry in the BPDB ("No" branch of decision block 230) an entry for the cache line associated with the memory request is added to the BPDB and its state is set to I (block 232). After determining that there is an entry for the cache line associated with the memory request in memory ("Yes" branch of decision block 230) or after adding an entry for a cache line in the BPDB (block 232), the sequence of operations updates the entry in the BPDB for the cache line according to operation associated with the memory request (e.g., according to what type of memory request the memory request is) (block 234). Specifically, the sequence of operations may update an entry in the BPDB consistent with the state diagram 110 illustrated in FIG. 6.

Figure 10:
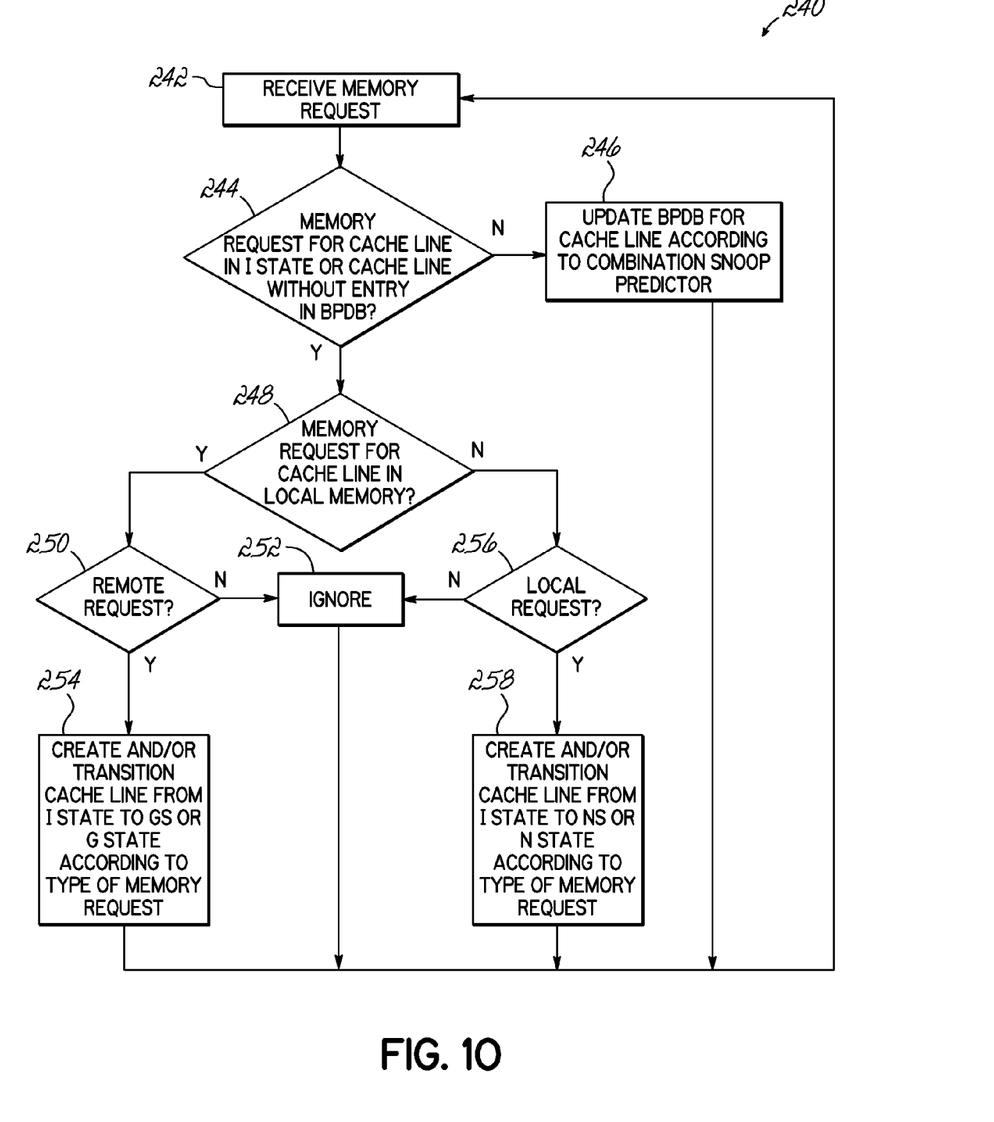
FIG. 10 is a flowchart illustrating a further alternative embodiment of a logic flow that may occur in a broadcast prediction data buffer disposed in the system of FIG. 2 to update broadcast prediction data with information predictive of whether to broadcast a global memory request for a cache line.

FIG. 10 is a flowchart 240 illustrating one embodiment of a sequence of operations that may occur in a node in a system to update a BPDB with information predictive of the state and/or ownership of a cache line. Specifically, the flowchart 240 may be utilized to adjust a BPDB in response to both local and remote memory requests. Initially, a memory request associated with the cache line is received (block 242). It is then determined whether there is an entry for the cache line that is associated with the memory request in the BPDB and that cache line in the I state, or whether there is no entry for the cache line that is associated with the memory request in the BPDB (block 244). When there is an entry for the cache line that is associated with the memory request in the BPDB and that cache line is not in the I state ("No" branch of decision block 244) the sequence of operations updates the entry in the BPDB for the cache line according to operation associated with the memory request (e.g., according to what type of memory request the memory request is) (block 246). Specifically, the sequence of operations may update an entry in the BPDB consistent with the state diagram 120 illustrated in FIG. 7.

When there is an entry for the cache line that is associated with the memory request in the BPDB and that cache line is the I state or when there is no entry for the cache line associated with the memory request in the BPDB ("Yes" branch of decision block 244), the sequence of operations determines whether the memory request is for a cache line in the local memory (e.g., the memory associated with the processing element or node) (block 248). As indicated above, the BPDB may only care about exception cases for cache lines, e.g., memory mapped to a processing unit and/or node but used by at least one other processing unit and/or node, or memory mapped to at least one other processing unit and/or node by used by that processing unit and/or node. Thus, when the memory request is for a cache line that is in the local memory ("Yes" branch of decision block 248) it is determined whether the memory request is a from a remote memory requester (e.g., the memory request is a remote memory request) (block 250). When the memory request for local memory is not a remote memory request ("No" branch of decision block 250) the BPDB ignores that memory request (block 252). However, when the memory request for local memory is a remote memory request ("Yes" branch of decision block 250) the BPDB creates an entry for that cache line and/or transitions an entry of that cache line from the I state to the GS or G state according to the type of memory request that the memory request is (e.g., whether it is a read or write request) (block 254).

Returning to block 248, when the memory request is for a cache line that is in a remote memory (e.g., the memory of another processing unit and/or node) ("No" branch of decision block 248) it is determined whether the memory request is a from a local memory requester (e.g., the memory request is a local memory request) (block 256). When the memory request for remote memory is not a local memory request ("No" branch of decision block 256) the BPDB ignores that memory request (block 252). However, when the memory request for remote memory is a local memory request ("Yes" branch of decision block 256) the BPDB creates an entry for that cache line and/or transitions an entry of that cache line from the I state to the NS or N state according to the type of memory request that the memory request is (e.g., whether it is a read or write request) (block 258).

In some embodiments, the BPDB is utilized to determine whether to broadcast a memory request to additional processing units and/or nodes in response to data within the BPDB. For example, and with reference to FIG. 5 and FIG. 7, data in the BPDB may indicate that a cache line is in the NS state, and thus indicate that a readable copy of the data probably exists locally. Specifically, the default for cache lines in the NS state may be that there is a local memory request for that cache line before there is a global memory request for that cache line. As such, the data in the BPDB may be checked against a requested cache line and prevent a global memory request from being broadcast to additional processing units and/or nodes when that cache line is in the NS state. Alternatively, the default for a request of a cache line in the NS state may be to broadcast a global memory request. The N state, on the other hand, indicates that the cache line is locally owned and not shared and that there is not a need for a global memory request.

Also for example, and with reference to FIGS. 6 and 7, data in the BPDB may indicate that a cache line is in the GS state, and thus indicate that a readable copy of the data may exist locally. Specifically, the default for cache lines in the GS state may be that there is a local memory request for that cache line before there is a global memory request for that cache line. As such, the data in the BPDB may be checked against a requested cache line and prevent a global memory request from being broadcast to additional processing units and/or nodes when that cache line is in the GS state. Alternatively, the default for a request of a cache line in the GS state may be to broadcast a global memory request. The G state, on the other hand, indicates that the cache line is remotely owned and not shared and that there is a need for a global memory request.

In some embodiments, the BPDB can include address decoders to distinguish addresses for cache lines that are local to the processing unit and/or node from addresses for cache lines that are not. As such, the BPDB can keep track of local cache lines cached by remote processing units and/or nodes, or keep track of remote cache lines cached by the processing unit and/or node.

Figure 11:
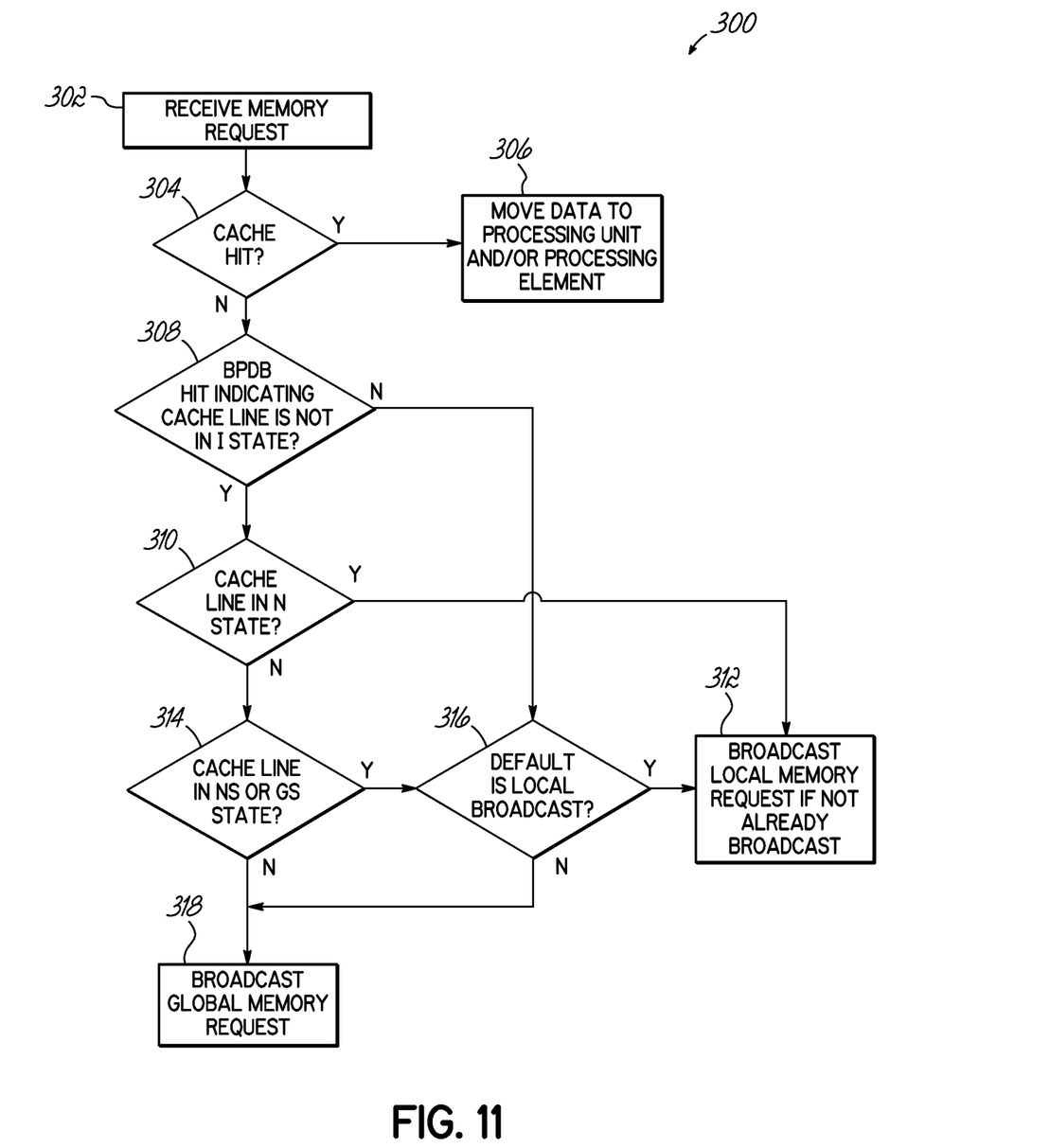
FIG. 11 is a flowchart illustrating an embodiment of logic flow that may occur in a broadcast prediction data buffer disposed in the system of FIG. 2 to predict whether to broadcast a global memory request for a cache line.

FIG. 11 is a flowchart 300 illustrating one embodiment of a sequence of operations that may occur in a node in a system to predict whether to broadcast a global memory request for a cache line consistent with embodiments of the invention. In some embodiments, the processing unit of the node makes a memory request for data (block 302), which may be for a cache line from a memory region, and in particular for a data cache line and/or an instruction cache line as is well known in the art. A cache of the node is accessed for the data (block 304), and in the event of a hit for the data in the cache ("Yes" branch of decision block 304) the data may be moved to the processing unit (block 306). When there is not a hit for the data in the cache ("No" branch of decision block 304), a BPDB may be accessed to predict whether to broadcast the memory request globally (block 308). When the BPDB contains data regarding the cache line indicating that the cache line is not in the I state ("Yes" branch of decision block 308), it is determined whether the cache line is in the N state (block 310). When it is determined that the cache line is in the N state ("Yes" branch of decision block 310), a memory request for the data may be broadcast to a second processing unit of the node and/or a memory to retrieve the cache line, if not broadcast already (block 312).

When it is determined that the cache line is not in the N state ("No" branch of decision block 310), it is determined whether the cache line is in the NS or GS state (block 314). When the cache line is in the NS or GS state ("Yes" branch of decision block 314) the sequence of operations determines whether the default is to broadcast a memory request for the cache line to the second processing unit of the node and/or a memory (block 316). When the default for the system is to broadcast a memory request for the cache line in the NS or GS state to a second processing unit of the node and/or a memory ("Yes" branch of block 316) a memory request for the data may be broadcast to a second processing unit of the node and/or a memory to retrieve the cache line if not broadcast already (block 312). When the cache line is not in the NS or GS state ("No" branch of decision block 314) or when the default for the system is to broadcast a memory request for the cache line in the NS or GS state to a second node of the system ("No" branch of decision block 316), a memory request for the cache line is broadcast to a second node (block 318). Returning to block 308, when the BPDB does not contain data regarding the cache line or when BPDB contains data regarding the cache line but that cache line is in the I state ("No" branch of decision block 308) the sequence of operations progresses to block 316 and proceeds as described above.

Further details and embodiments of the present invention will be described by way of the following examples

EXAMPLE 1

As an example, assume a two-node system with each processing unit of each node including a BPDB. Each BPDB, in turn, is configured to track whether data resides in that node based upon local memory requests. As such, the BPDB transitions the states of cache lines similarly to the transitions of states illustrated in FIG. 5. The system runs a program with a cache line A that is shared by all the processing units. When a processing unit X in the first node requests to write to cache line A, all other cached copies of the cache line in the system are invalidated. However, the processing unit in the first node (local to X) may allocate and/or adjust an entry in their BPDB for the cache line A to the N state, while a processing unit in the second node (remote to X) may allocate and/or adjust an entry in their BPDB for the cache line A to the I state. Should another processing unit Y in the first node (local to X) attempt to read cache line A next, a request need only be sent to the remaining processing units or memory of the first node. Conversely, if a processing unit Z in the second node (remote to processing unit X) attempts to read to cache line A next, it will find cache line A in the I state in its cache, no entry in its BDPB, and/or an entry for cache line A in the BDPB in the I state. As such, processing unit Z will immediately broadcast a memory request for cache line A to the first node and/or both nodes. Specifically, checking the second node first would have been a waste of time since processing unit X of the first node holds the only valid copy of cache line A. In response to this broadcast, processing units with BPDB entries for cache line A in the first node (remote to Z) will see the remote read and allocate and/or adjust an entry in their BPDB for the cache line A to the NS state. Any additional processing units in the second node (local to Z) may allocate and/or adjust an entry in their BPDB for the cache line A to the NS state.

While the present invention has been illustrated by a description of the various embodiments and the example, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, as discussed above, a person having ordinary skill in the art will appreciate that the BPDB may be implemented in a cache coherent non-memory access ("ccNUMA") system consistent with embodiments of the invention. Specifically, the ccNUMA may include a plurality of nodes 42 as described above. The BDPB may then predict when to check a local node before sending a memory request to a home node. As such, traffic at the home node is reduced for requests that can be satisfied by the local node (if the home node is different from the local node). Still further, memory requests that are predicted to involve global memory requests may be sent to the home node (and possibly forwarded to other nodes) without being slowed by checking a local node first. Still further, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of applicants' general inventive concept

What is claimed is:

1. A method of determining whether to globally broadcast a memory request in a computing system of the type that includes a plurality of nodes, wherein each node includes a plurality of processing units, the method comprising, in a first node among the plurality of nodes:

in response to a first memory request, updating broadcast prediction data for a cache line associated with the first memory request within a hardware-based broadcast prediction data structure in turn associated with a first processing unit among the plurality of processing units, the broadcast prediction data for the cache line including data associated with a history of ownership of the cache line, wherein updating the broadcast prediction data for the cache line associated with the first memory request includes updating the broadcast prediction data for the cache line to indicate that the cache line is in one of at least three states; and in response to a second memory request that is associated with the cache line, accessing the broadcast prediction data structure and determining whether to perform an early broadcast of the second memory request to a second node among the plurality of nodes based on broadcast prediction data within the broadcast prediction data structure.

2. The method of claim 1, wherein determining whether to perform an early broadcast of the second memory request to the second node includes:
    determining whether the broadcast prediction data structure includes the broadcast prediction data for the cache line; and
    in response to determining that the broadcast prediction data structure does not include the broadcast prediction data for the cache line, performing an early broadcast of the second memory request to the second node.

3. The method of claim 1, wherein determining whether to perform an early broadcast of the second memory request to the second node includes:
    determining whether the broadcast prediction data structure includes the broadcast prediction data for the cache line; and
    in response to determining that the broadcast prediction data structure does not include the broadcast prediction data for the cache line, broadcasting the second memory request within the first node.

4. The method of claim 1, wherein determining whether to perform an early broadcast of the second memory request to the second node includes:
    determining whether the broadcast prediction data structure includes the broadcast prediction data for the cache line; and
    in response to determining that the broadcast prediction data structure includes the broadcast prediction data for the cache line, performing an early broadcast of the second memory request to the second node.

5. The method of claim 1, wherein determining whether to perform an early broadcast of the second memory request to the second node includes:
    determining whether the broadcast prediction data structure includes the broadcast prediction data for the cache line; and
    in response to determining that the broadcast prediction data structure includes the broadcast prediction data for the cache line, broadcasting the second memory request within the first node.

6. The method of claim 1, wherein updating the broadcast prediction data for the cache line includes:
    updating the broadcast prediction data to predict that the second memory request should be broadcast to a second processing unit among the plurality of processing units of the first node.

7. The method of claim 1, wherein updating the broadcast prediction data for the cache line includes:
    updating the broadcast prediction data to predict that the second memory request should be broadcast to the second node.

8. The method of claim 1, wherein updating the broadcast prediction data for the cache line includes:
    invalidating the broadcast prediction data.

9. The method of claim 1, wherein the first memory request is from at least one of the plurality of processing units of the first node.

10. The method of claim 1, wherein the first memory request is from the second node.

11. The method of claim 1, further comprising:
    in response to the first memory request, accessing a cache associated with the first processing unit for data associated with the cache line, wherein updating the broadcast prediction data for the cache line is performed in response to a miss for data associated with the cache line in the cache.

12. The method of claim 1, further comprising:
    in response to the first memory request, accessing a cache associated with the first processing unit for data associated with the cache line, wherein updating the broadcast prediction data for the cache line is performed concurrently with accessing the cache.

13. The method of claim 1, wherein the broadcast prediction data predicts whether the cache line is cached in the first node.

14. The method of claim 1, wherein the broadcast prediction data predicts whether the cache line is cached in the second node.

15. The method of claim 1, wherein the broadcast prediction data structure is separate from at least one cache associated with the first processing unit.

16. The method of claim 1,
    wherein updating the broadcast prediction data for the cache line associated with the first memory request includes updating the broadcast prediction data for the cache line to indicate that the cache line is in at least one of the following states: a state in which a readable copy of the cache line may exist in the first node, a state in which a readable copy of the cache line exists in the first node, a state in which a readable copy of the cache line may not exist in the first node, a state in which a readable copy of the cache line does not exist in the first node, a state in which a readably copy of the cache line exists in at least one of the remaining plurality of nodes.

17. A circuit arrangement configured on a first node of a computing system of the type that includes a plurality of nodes, comprising:
    a cache configured to store a plurality of cache lines;
    a broadcast prediction data buffer configured to store broadcast prediction data for a cache line, wherein the broadcast prediction data includes data associated with a history of ownership of the cache line; and
    control logic coupled to the broadcast prediction data buffer and configured to update the broadcast prediction data for the cache line in response to a first memory request associated with the cache line, the control logic further configured to access the broadcast prediction data structure and determine whether to perform an early broadcast of a second memory request associated with the cache line to a second node based on the broadcast prediction data, wherein the control logic is configured to update the broadcast prediction data for the cache line in response to the first memory request by updating the broadcast prediction data for the cache line to indicate that the cache line is in one of at least three states.

18. The circuit arrangement of claim 16, wherein the control logic is configured to update the broadcast prediction data to predict that the second memory request should be broadcast within the first node.

19. The circuit arrangement of claim 16, wherein the control logic is configured to update the broadcast prediction data to predict that the second memory request should be broadcast early to a second node.

20. The circuit arrangement of claim 16, wherein the broadcast prediction data predicts whether the cache line is cached in the first node.

21. The circuit arrangement of claim 16, wherein the broadcast prediction data predicts whether the cache line is cached in the second node.

22. The circuit arrangement of claim 16, wherein the broadcast prediction data structure is separate from the cache.

23. A design structure embodied in a non-transitory machine readable medium for designing or manufacturing an integrated circuit device included on a first node of a computing system of the type that includes a plurality of nodes, the integrated circuit device comprising:
   a cache configured to store a plurality of cache lines;
   a broadcast prediction data buffer configured to store broadcast prediction data for a cache line, wherein the broadcast prediction data includes data associated with a history of ownership of the cache line; and
   control logic coupled to the broadcast prediction data buffer configured to update the broadcast prediction data for the cache line in response to a first memory request associated with a the cache line, the control logic further configured to access the broadcast prediction data structure and determine whether to perform an early broadcast of a second memory request associated with the cache line to a second node based on the broadcast prediction data, wherein the control logic is configured to update the broadcast prediction data for the cache line in response to the first memory request by updating the broadcast prediction data for the cache line to indicate that the cache line is in one of at least three states.

* * * * *